(12) United States Patent
Morita (10) Patent No.: US 12,506,353 B2
(45) Date of Patent: Dec. 23, 2025

(54) POWER SUPPLY SYSTEM

(71) Applicant: DENSO CORPORATION, Kariya (JP)

(72) Inventor: Tetsuo Morita, Kariya (JP)

(73) Assignee: DENSO CORPORATION, Kariya (JP)

( * ) Notice: Subject to any disclaimer, the term of this patent is extended or adjusted under 35 U.S.C. 154(b) by 611 days.

(21) Appl. No.: 17/983,574

(22) Filed: Nov. 9, 2022

(65) Prior Publication Data

US 2023/0072786 A1 Mar. 9, 2023

Related U.S. Application Data

(63) Continuation of application No. PCT/JP2021/017358, filed on May 6, 2021.

(30) Foreign Application Priority Data

May 12, 2020 (JP) ................................. 2020-083848

(51) Int. Cl.
| | |
|---|---|
| *H02J 7/00* | (2006.01) |
| *B60L 1/00* | (2006.01) |
| *B60L 3/00* | (2019.01) |
| *B60L 3/04* | (2006.01) |
| *B60L 50/60* | (2019.01) |
| *B60L 58/10* | (2019.01) |

(Continued)

(52) U.S. Cl.
CPC ............... *H02J 7/342* (2020.01); *B60L 1/00* (2013.01); *B60L 3/0023* (2013.01); *B60L 3/0092* (2013.01); *B60L 3/04* (2013.01); *B60L 50/60* (2019.02); *B60L 58/10* (2019.02); *B60R 16/03* (2013.01); *H02J 1/086* (2020.01); *H02J 7/0063* (2013.01); *H02J 7/00712* (2020.01); *B60L 2260/26* (2013.01); *H02J 2207/20* (2020.01)

(58) Field of Classification Search
CPC ...... H02J 7/342; H02J 7/0063; H02J 7/00712; H02J 1/086; H02J 2207/20; B60L 3/0023; B60L 3/0092; B60L 3/04; B60L 1/00; B60L 50/60; B60L 58/10; B60L 2260/26; B60R 16/03
USPC .................................................. 320/103, 109
See application file for complete search history.

(56) References Cited

U.S. PATENT DOCUMENTS

| | | | |
|---|---|---|---|
| 2003/0081440 A1* | 5/2003 | Komatsu | B60L 3/0023 363/132 |
| 2019/0260225 A1* | 8/2019 | Hida | H02M 3/158 |
| 2020/0003843 A1* | 1/2020 | Kinoshita | F02N 11/087 |

FOREIGN PATENT DOCUMENTS

JP 2019-030116 A 2/2019

\* cited by examiner

*Primary Examiner* — Zixuan Zhou
(74) *Attorney, Agent, or Firm* — Oliff PLC (57) ABSTRACT

A power supply system includes: electrical loads; a first system including a first power supply that outputs a power supply voltage; a second system including a second power supply that includes a storage battery; an inter-system switch; an abnormality determination unit that determines whether an abnormality has occurred in the first system; and a state control unit that opens the inter-system switch when it is determined that an abnormality has occurred in the first system. A first path and a second path are provided in parallel with each other between a connection point and the second power supply. In the first path, there is provided an electric power converter. The storage battery is charged to a voltage higher than the lower limit of drive voltages of the electrical loads. Through the second path, the voltage of the storage battery can be applied, bypassing the power converter, to the electrical loads.

6 Claims, 7 Drawing Sheets

(51) Int. Cl.
*B60R 16/03* (2006.01)
*H02J 1/08* (2006.01)
*H02J 7/34* (2006.01)

POWER SUPPLY SYSTEM

CROSS-REFERENCE TO RELATED APPLICATIONS

The present application is a continuation application of International Application No. PCT/JP2021/017358 filed on May 6, 2021, which is based on and claims priority from Japanese Patent Application No. 2020-083848 filed on May 12, 2020. The entire contents of these applications are incorporated by reference into the present application.

BACKGROUND

1 Technical Field

The present disclosure relates to power supply systems.

2 Description of Related Art

In recent years, power supply systems have been known which are applied to, for example, vehicles to supply electric power to various devices in the vehicles. In these power supply systems, when an abnormality occurs, during driving of the vehicle, in a system that supplies electric power to electrical loads that perform functions necessary for the driving of the vehicle, such as an electric brake device and an electric steering device, and the functions of the electrical loads are lost due to the abnormality, the driving of the vehicle cannot be continued. Moreover, apparatuses have been known which include both a first power supply and a second power supply for supplying electric power to the electrical loads, so as to prevent the functions of the electrical loads from being lost even when an abnormality occurs during the driving of the vehicle.

SUMMARY

According to the present disclosure, there is provided a power supply system which includes: a first system including a first power supply connected with the electrical loads; a second system including a second power supply connected with the electrical loads; and an inter-system switch provided in a connection path that connects the first and second systems with each other. The first power supply outputs a power supply voltage by which it is possible to drive the electrical loads. The second power supply includes a storage battery chargeable by the power supply voltage of the first power supply. The power supply system further includes: an abnormality determination unit that determines whether an abnormality has occurred in the first system; and a state control unit that opens the inter-system switch when it is determined by the abnormality determination unit that an abnormality has occurred in the first system. Moreover, a first path and a second path are provided in parallel with each other between a connection point, at which the connection path is connected with the second system, and the second power supply. In the first path, there is provided an electric power converter that performs electric power conversion when the storage battery is charged with electric power supplied from the first power supply and when the storage battery discharges. The storage battery is configured to be charged, by the electric power converter, to a voltage higher than a lower limit of drive voltages of the electrical loads. Through the second path, the voltage of the storage battery can be applied, bypassing the electric power converter, to the electrical loads.

DESCRIPTION OF EMBODIMENTS

For example, Japanese Patent Application Publication No. JP2019030116A discloses a power supply system that has both a first system including a first power supply as a high-voltage power supply and a second system including a second power supply as a low-voltage power supply. Moreover, in the power supply system, an inter-system switch is provided in a connection path that connects the first and second systems with each other. Further, a DC-to-DC converter (hereinafter, to be simply referred to as the converter) is provided in a path between a connection point, at which the connection path is connected with the second system, and the second power supply; thus, the second power supply can be charged via the converter. Furthermore, when it is determined by a controller that an abnormality has occurred in the first system, the inter-system switch is opened and electric power is supplied from the second power supply to the electrical loads by discharge of the second power supply via the converter. That is, with the electric power supplied from the second power supply of the second system, where no abnormality has occurred, to the electrical loads, it becomes possible to ensure the functions of the electrical loads necessary for the driving of the vehicle and to continue the driving of the vehicle.

However, in the power supply system disclosed in the above patent document, electric power conversion is performed by the converter at the time of the discharge of the second power supply; therefore, the discharge of the second power supply is started after a preparation process for the electric power conversion. Accordingly, a predetermined period is required from the start of the preparation process until the discharge of the second power supply is actually started; during the predetermined period, electric power may not be suitably supplied to the electrical loads.

The present disclosure has been made to solve the above-described problem.

In the above-described power supply system according to the present disclosure, there are provided both the first system including the first power supply and the second system including the second power supply in the power supply system. Consequently, with the first and second power supplies, it becomes possible to secure redundancy of electric power supply to the electrical loads. Moreover, there is provided the inter-system switch in the connection path that connects the first and second systems with each other. Consequently, when it is determined that an abnormality has occurred in one of the two systems, it is possible to continue, by opening the inter-system switch, the operations of the electrical loads with electric power supplied from the power supply of the other of the two systems which has no abnormality occurring therein.

When the inter-system switch is opened due to, for example, occurrence of an abnormality in the first system, discharge of the storage battery of the second power supply is performed via the electric power converter in the second system. However, electric power conversion is performed by the electric power converter at the time of the discharge of the storage battery; therefore, the discharge of the storage battery is started after a preparation process for the electric power conversion. Accordingly, a predetermined period is required from the start of the preparation process until the discharge of the storage battery is actually started; during the predetermined period, electric power may not be suitably supplied to the electrical loads.

In this regard, in the above configuration, the first path and the second path are provided in parallel with each other between the connection point, at which the connection path is connected with the second system, and the second power supply. In the first path, there is provided the electric power converter; through the electric power conversion by the electric power converter, the storage battery is charged to a voltage higher than the lower limit of the drive voltages of the electrical loads, or discharges. On the other hand, through the second path, the voltage of the storage battery can be applied, bypassing the electric power converter, to the electrical loads. With such a configuration, when electric power supply from the storage battery is performed in the second system due to occurrence of an abnormality in the first system, the storage battery of the second power supply has been charged to a voltage higher than the lower limit of the drive voltages of the electrical loads. Therefore, during the predetermined period required for the electric power conversion by the electric power converter, it is possible to apply this voltage to the electrical loads bypassing the electric power converter. Consequently, it becomes possible to suitably supply electric power to the electrical loads in the power supply system that has the plurality of systems including the respective power supplies.

In further implementations, in the second path, there is provided a battery switch that opens or closes the second path. The electric power converter performs or stops charge/discharge of the storage battery according to a command from the state control unit. When it is determined by the abnormality determination unit that an abnormality has occurred in the first system, the state control unit opens the inter-system switch and outputs, to the electric power converter, the command to perform discharge of the storage battery. The state control unit keeps the battery switch in a closed state during a predetermined period including a period from when the command is outputted until the discharge of the storage battery is started.

With the above configuration, the battery switch is provided in the second path. When an abnormality has occurred in the first system, the battery switch is closed in conjunction with the output of the discharge command to the electric power converter. Specifically, the battery switch is kept in the closed state during the predetermined period including the period from when the command to perform discharge of the storage battery is outputted to the electric power converter until the discharge of the storage battery is started. Consequently, it becomes possible to suitably supply electric power to the electrical loads even when an abnormality has occurred in the first system.

The electric power converter performs, during the discharge of the storage battery, a boosting operation to boost the voltage of the storage battery. The state control unit opens the battery switch after the discharge of the storage battery is started.

In the configuration where the voltage of the electrical loads is set to be higher than the voltage of the storage battery during the discharge of the storage battery via the electric power converter, if the battery switch was kept in the closed state after the start of the discharge of the storage battery via the electric power converter, the increase of the voltage of the electrical loads might be delayed due to charge of the storage battery through the second path and the voltage of the electrical loads might become unstable. In this regard, with the above configuration, the battery switch is opened after the discharge of the storage battery via the electric power converter is started. Consequently, the voltage of the electrical loads can be suitably increased.

The electric power converter performs, during charge of the storage battery, a step-down operation to step down the voltage of the storage battery. Moreover, the electric power converter also performs, during discharge of the storage battery, a boosting operation to boost the voltage of the storage battery. In the second path, there is provided a rectifying element that restricts electric current from flowing from the connection point to the storage battery in the second path.

In the configuration where the voltage of the storage battery is set to be lower than the power supply voltage during the charge of the storage battery, there is provided the rectifying element in the second path to restrict electric current from flowing from the connection point to the storage battery. Consequently, it becomes possible to construct the power supply system using the storage battery whose rated voltage is lower than the power supply voltage. Moreover, when an abnormality has occurred in the first system, the discharge of the storage battery is performed through the second path in the second system with decrease in the voltage of the electrical loads, thereby making it possible to supply electric power from the storage battery to the electrical loads in an early stage without waiting for the predetermined period required for the boosting operation of the electric power converter.

In the second path, there is provided a semiconductor switching element that includes a parasitic diode. The parasitic diode constitutes the rectifying element. The state control unit turns the semiconductor switching element into a conductive state when it is determined by the abnormality determination unit that an abnormality has occurred in the first system.

In the configuration where the parasitic diode of the semiconductor switching element is used as the rectifying element, when an abnormality has occurred in the first system, electric power can be supplied from the storage battery to the electrical loads via the parasitic diode. However, there are concerns about the voltage drop in the second path due to the forward voltage drop of the parasitic diode and about heat generation in the parasitic diode due to energization thereof. In this regard, in the above configuration, when an abnormality has occurred in the first system, the semiconductor switching element is turned into the conductive state, thereby suppressing the voltage drop in the second path due to the forward voltage drop of the parasitic diode and suppressing heat generation in the parasitic diode.

The power supply system is installed in a vehicle. Each of the electrical loads performs a driver assistance function of the vehicle as well as at least one function necessary for driving of the vehicle. The driving mode of the vehicle is switchable between a first mode using the driver assistance function and a second mode not using the driver assistance function. The power supply system further includes a mode control unit that permits the driving mode of the vehicle to be switched from the second mode to the first mode on condition that the state of charge of the storage battery is such that the voltage of the storage battery is higher than the lower limit of the drive voltages of the electrical loads.

In the power supply system applied to the vehicle having the electrical loads each performing a driver assistance function as well as at least one function necessary for driving of the vehicle, the driving mode of the vehicle is switchable between the first mode using the driver assistance function and the second mode not using the driver assistance function. Moreover, in the above configuration, the driving mode of the vehicle is permitted to be switched from the second mode to the first mode on condition that the state of charge of the storage battery is such that the voltage of the storage battery is higher than the lower limit of the drive voltages of the electrical loads. Consequently, if an abnormality occurs in the first system after the switching of the driving mode to the first mode, it will be possible to suitably perform a subsequent fail-safe process.

First Embodiment

Hereinafter, an embodiment will be described with reference to the drawings; in the embodiment, a power supply system according to the present disclosure is embodied as an in-vehicle power supply system 100.

Figure 1:
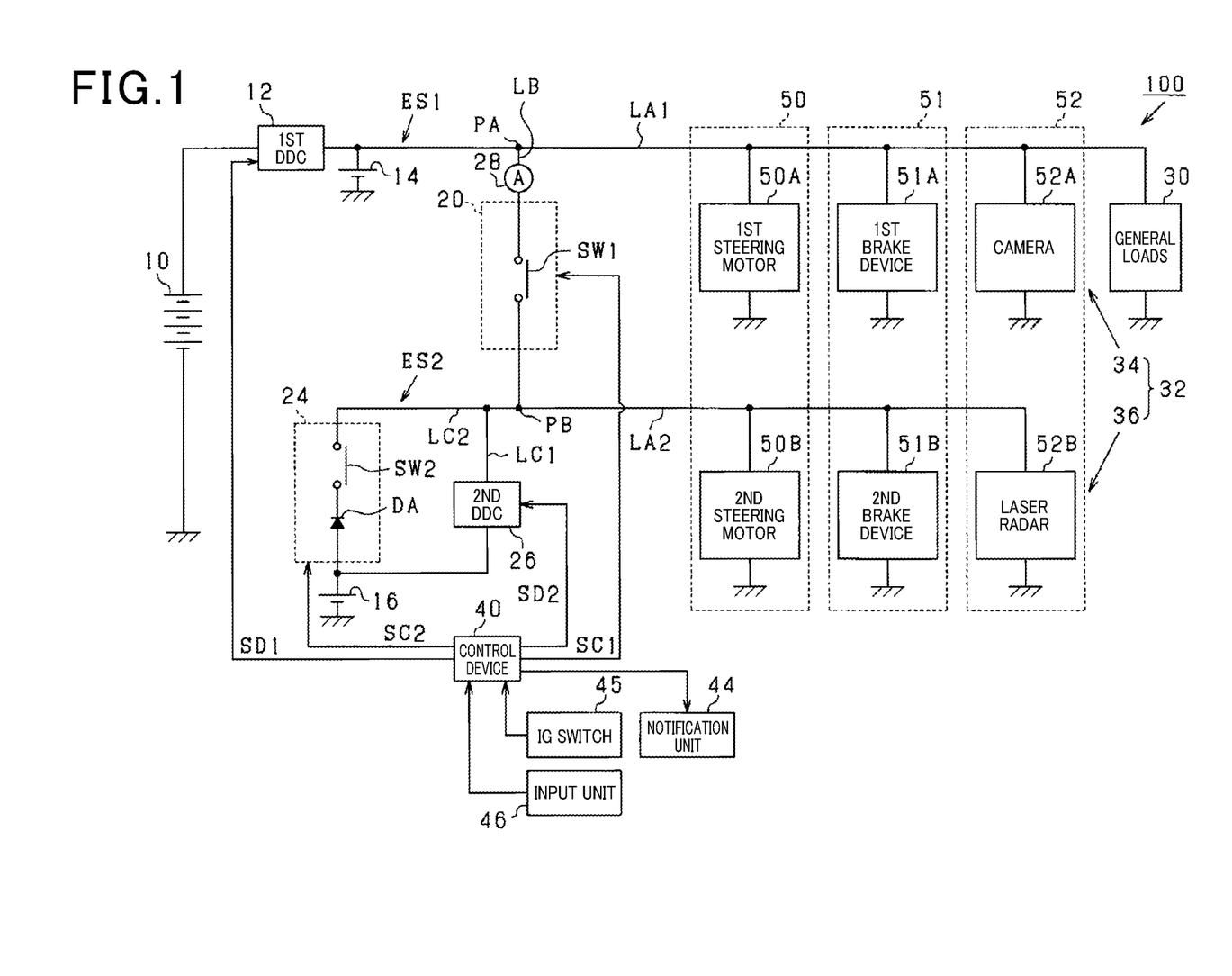
FIG. 1 is an overall configuration diagram of a power supply system according to a first embodiment.

As shown in FIG. 1, the power supply system 100 is configured to supply electric power to general loads 30 and specific loads 32. Specifically, the power supply system 100 includes a high-voltage storage battery 10, a first DC-to-DC converter (hereinafter, to be simply referred to as the first converter) 12, a first storage battery 14, a second storage battery 16, a switch unit 20, a second DC-to-DC converter (hereinafter, to be simply referred to as the second converter) 26, and a control device 40.

The high-voltage storage battery 10 has a rated voltage (e.g., several hundred volts) higher than those of the first storage battery 14 and the second storage battery 16. The high-voltage storage battery 10 may be implemented by, for example, a lithium-ion battery. The first converter 12 serves as a voltage generator to convert the electric power supplied from the high-voltage storage battery 10 into electric power of a power supply voltage VA and supply the resultant electric power to the general loads 30 and the specific loads 32. In the present embodiment, the power supply voltage VA is set to a voltage by which it is possible to drive the general loads 30 and the specific loads 32.

The general loads 30 are electrical loads which are not used for driving control of a vehicle that is a moving object. The loads 30 may include, for example, an air conditioner, an audio device and a power window.

On the other hand, the specific loads 32 are loads each of which performs at least one function necessary for the driving control of the vehicle. The specific loads 32 may include, for example, an electric power steering device 50 for controlling steering of the vehicle, an electric brake device 51 for applying a braking force to wheels of the vehicle, and a travel control device 52 for monitoring the surrounding situation of the vehicle. In addition, in the present embodiment, the specific loads 32 correspond to "electrical loads" in the claims.

When abnormalities occur in the specific loads 32 and all the functions of the specific loads 32 are lost due to the abnormalities, it will become impossible to perform the driving control of the vehicle. Therefore, to prevent the functions of the specific loads 32 from being lost even when abnormalities occur in the specific loads 32, in the present embodiment, each of the specific loads 32 includes both a first load 34 and a second load 36 provided redundantly for performing the function(s) of the specific load 32. Specifically, the electric power steering device 50 includes both a first steering motor 50A and a second steering motor 50B. The electric brake device 51 includes both a first brake device 51A and a second brake device 51B. The travel control device 52 includes both a camera 52A and a laser radar 52B. In addition, each of the first steering motor 50A, the first brake device 51A and the camera 52A corresponds to a first load 34 while each of the second steering motor 50B, the second brake device 51B and the laser radar 52B corresponds to a second load 36.

For each of the specific loads 32, the first load 34 and the second load 36 constituting the specific load 32 together realize one function of the specific load 32; moreover, each of the first load 34 and the second load 36 can individually realize part of the function. For example, the vehicle can be freely steered by both the first steering motor 50A and the second steering motor 50B of the electric power steering device 50. Moreover, the vehicle can also be steered by only either one of the steering motors 50A and 50B under certain limitations on the steering speed, the steering range and the like.

During manual driving of the vehicle, each of the specific loads 32 realizes a function of assisting a driver in controlling the vehicle. Moreover, during autonomous driving of the vehicle, each of the specific loads 32 realizes a function necessary for the autonomous driving; in the autonomous driving, the vehicle behavior, such as traveling or stopping of the vehicle, is automatically controlled. Therefore, each of the specific loads 32 can also be referred to as a load that performs at least one function necessary for driving the vehicle.

The first loads 34 of the specific loads 32 are connected with the first converter 12 via a first-system internal path LA1. Moreover, the first storage battery 14 and the general loads 30 are also connected with the first-system internal path LA1. The first storage battery 14 may be implemented by, for example, a lead-acid battery. In the present embodiment, a first system ES1 is constituted of the first converter 12, the first storage battery 14, the general loads 30 and the first loads 34 of the specific loads 32, all of which are connected with each other by the first-system internal path LA1. In addition, in the present embodiment, the high-voltage storage battery 10, the first converter 12 and the first storage battery 14 together correspond to a "first power supply" in the claims.

On the other hand, the second loads 36 of the specific loads 32 are connected with the second storage battery 16 via a second-system internal path LA2. The second storage battery 16 may be implemented by, for example, a lithium-ion battery. The rated voltage of the second storage battery 16 is set to be lower than the power supply voltage VA of the first converter 12. In the present embodiment, a second system ES2 is constituted of the second storage battery 16 and the second loads 36 of the specific loads 32, all of which are connected with each other by the second-system internal path LA2. In addition, in the present embodiment, the second storage battery 16 corresponds to both a "second power supply" and a "storage battery" in the claims.

The switch unit 20 is provided in a connection path LB that connects the first and second systems ES1 and ES2 with each other. The connection path LB has a first end connected with the first-system internal path LA1 at a connection point PA, and a second end connected with the second-system internal path LA2 at a connection point PB. The switch unit 20 includes a first switching element (hereinafter, to be simply referred to as the first switch) SW1. In the present embodiment, an N-channel MOSFET (hereinafter, to be simply referred to as the MOSFET) is employed as the first switch SW1. In addition, in the present embodiment, the first switch SW1 corresponds to an "inter-system switch" in the claims.

In the connection path LB, there is provided a current detection unit 28. Specifically, the current detection unit 28 is provided in a portion of the connection path LB, which is on the first system ES1 side of the switch unit 20, to detect both the magnitude and the direction of inter-system current IA flowing through the portion of the connection path LB.

The second converter 26 is provided in the second-system internal path LA2. Specifically, in the second-system internal path LA2, the second converter 26 is provided between the connection point PB, at which the connection path LB is connected with the second-system internal path LA2, and the second storage battery 16. The second converter 26 converts the electric power of the power supply voltage VA supplied from the first converter 12 into electric power of a step-down voltage that is lower than the power supply voltage VA, and charges the second storage battery 16 with the resultant electric power. Moreover, at the time of discharge of the second storage battery 16, the second converter 26 boosts the voltage of the second storage battery 16 and applies the boosted voltage to the second loads 36 of the specific loads 32. That is, the second converter 26 is a bidirectional electric power converter which can perform both a boosting operation and a step-down operation and performs electric power conversion at both the time of charge of the second storage battery 16 and the time of discharge of the second storage battery 16. In addition, the second storage battery 16 is a storage battery which can be charged by the power supply voltage VA of the first converter 12.

In order to perform switching operation of the first switch SW1, the control device 40 generates a first switching signal SC1 based on the detected value of the current detection unit 28 and outputs a command by the first switching signal SC1 to the first switch SW1. Moreover, in order to control operations of the first and second converters 12 and 26, the control device 40 generates first and second control signals SD1 and SD2 and outputs commands by the first and second control signals SD1 and SD2 to the first and second converters 12 and 26. The first and second converters 12 and 26 are switched between an operation state and an operation-stopped state respectively by the first and second control signals SD1 and SD2. In addition, the operation state of the second converter 26 includes both a charge operation state in which the second storage battery 16 is charged and a discharge operation state in which the second storage battery 16 is caused to discharge.

Furthermore, the control device 40 is connected with a notification unit 44, an IG switch 45 and an input unit 46 to control them. The notification unit 44 is a device which visually or audibly notifies the driver of the vehicle. The notification unit 44 may be implemented by, for example, a display or a speaker installed in the vehicle compartment. The IG switch 45 is a start switch of the vehicle. The control device 40 monitors the opening/closing of the IG switch 45. The input unit 46 is a device which receives the driver's operation. The input unit 46 may include, for example, a steering wheel, a lever, a button, a pedal and a voice input device.

The control device 40 controls manual driving and autonomous driving of the vehicle using the specific loads 32 described above. The control device 40 is configured with a well-known microcomputer which includes a CPU, a ROM, a RAM, a flash memory and the like. The CPU realizes, using calculation programs and control data stored in the ROM, various functions for manual driving and autonomous driving of the vehicle.

In addition, manual driving denotes a state in which driving control of the vehicle is performed by the driver's operation. In contrast, autonomous driving denotes a state in which driving control of the vehicle is performed according to the control content of the control device 40 regardless of the driver's operation. Specifically, in the present embodiment, autonomous driving denotes autonomous driving of level 3 or higher among autonomous driving levels from level 0 to level 5 defined by the National Highway Traffic Safety Administration (NHTSA). In addition, level 3 is a level at which the control device 40 controls both the steering wheel operation and the acceleration/deceleration of the vehicle while observing the traveling environment of the vehicle.

The control device 40 can perform, using the specific loads 32 described above, driver assistance functions such as a Lane Keeping Assist (LKA), a Lane Change Assist (LCA) and a Pre-Crash Safety (PCS). The control device 40 can switch the driving mode of the vehicle between a first mode using the driver assistance functions and a second mode not using the driver assistance functions; and the vehicle can travel in each of the first and second modes. Specifically, the control device 40 switches the driving mode of the vehicle between the first mode and the second mode in accordance with a switching command of the driver inputted via the input unit 46. In the present embodiment, the first mode includes both a mode in which the driver manually drives the vehicle using the driver assistance functions and a mode in which the vehicle is automatically driven. In contrast, the second mode is a mode in which the driver manually drives the vehicle without using the driver assistance functions.

In the first mode, the control device 40 determines whether abnormalities have occurred in the first system ES1 and the second system ES2. When it is determined that no abnormality has occurred in both the first and second systems ES1 and ES2, autonomous driving of the vehicle and driver assistance are performed using the first loads 34 and the second loads 36. Consequently, the first and second loads 34 and 36 of each of the specific loads 32 together perform at least one function necessary for the autonomous driving and driver assistance. In the present embodiment, abnormalities denote power failure abnormalities such as a ground fault and an open circuit.

On the other hand, when it is determined that an abnormality has occurred in either of the first and second systems ES1 and ES2, the first switch SW1 is opened to electrically isolate the first and second systems ES1 and ES2 from each other. Consequently, it becomes possible to drive, when an abnormality has occurred in one of the first and second systems ES1 and ES2, the loads 34 or 36 of the other of the first and second systems ES1 and ES2 which has no abnormality occurring therein.

When the first switch SW1 is opened due to occurrence of an abnormality in the first system ES1, electric power is supplied to the second loads 36 by discharge of the second storage battery 16 via the second converter 26 in the second system ES2. However, electric power conversion is performed by the second converter 26 at the time of the discharge of the second storage battery 16; therefore, the discharge of the second storage battery 16 is started after a preparation process for the electric power conversion. For example, in the case of the converter having a primary coil on the input side and a secondary coil on the output side, the preparation process is a process of causing a predetermined current to flow through the primary coil. Accordingly, a predetermined period TS is required from the start of the preparation process until the discharge of the second storage battery 16 is actually started; during the predetermined period TS, electric power may not be suitably supplied to the second loads 36 in the second system ES2.

To solve the above problem, in the present embodiment, a first path LC1 and a second path LC2 are provided in parallel with each other between the connection point PB, at which the connection path LB is connected with the second system ES2, and the second storage battery 16. In the first path LC1, there is provided the aforementioned second converter 26; through the electric power conversion by the second converter 26, the second storage battery 16 is charged to a voltage higher than a threshold voltage Vth, which is the lower limit of drive voltages of the first and second loads 34 and 36 of the specific loads 32, or discharges.

On the other hand, through the second path LC2, the voltage of the second storage battery 16 can be applied, bypassing the second converter 26, to the first and second loads 34 and 36. Specifically, a switch unit 24 is provided in the second path LC2. Hereinafter, for the sake of distinction, the switch unit 20 will be referred to as the first switch unit 20; and the switch unit 24 will be referred to as the second switch unit 24. In the second switch unit 24, there are provided a second switching element (hereinafter, to be simply referred to as the second switch) SW2 and a diode DA that are connected in series with each other. More specifically, in the second switch unit 24, the second switch SW2 is located closer than the diode DA to the connection path LB.

The second switch SW2 opens or closes the second system ES2. In the present embodiment, a MOSFET is employed as the second switch SW2. In order to perform switching operation of the second switch SW2, the control device 40 generates a second switching signal SC2 and outputs a command by the second switching signal SC2 to the second switch SW2. The diode DA is arranged with its cathode on the connection point PB side and its anode on the second storage battery 16 side. In addition, in the present embodiment, the second switch SW2 corresponds to a "battery switch" in the claims.

With the above configuration, when electric power supply from the second storage battery 16 is performed in the second system ES2 due to occurrence of an abnormality in the first system ES1, the second storage battery 16 has been charged to a voltage higher than the threshold voltage Vth that is the lower limit of the drive voltages of the first and second loads 34 and 36 of the specific loads 32. In the present embodiment, during the predetermined period TS required for the electric power conversion by the second converter 26 accompanying the discharge of the second storage battery 16, a control process is performed to apply the threshold voltage Vth to the second loads 36 bypassing the second converter 26. Consequently, it becomes possible to suitably supply electric power to the loads 34 and 36 in the power supply system 100 that has the plurality of systems including the respective power supplies.

Figure 2:
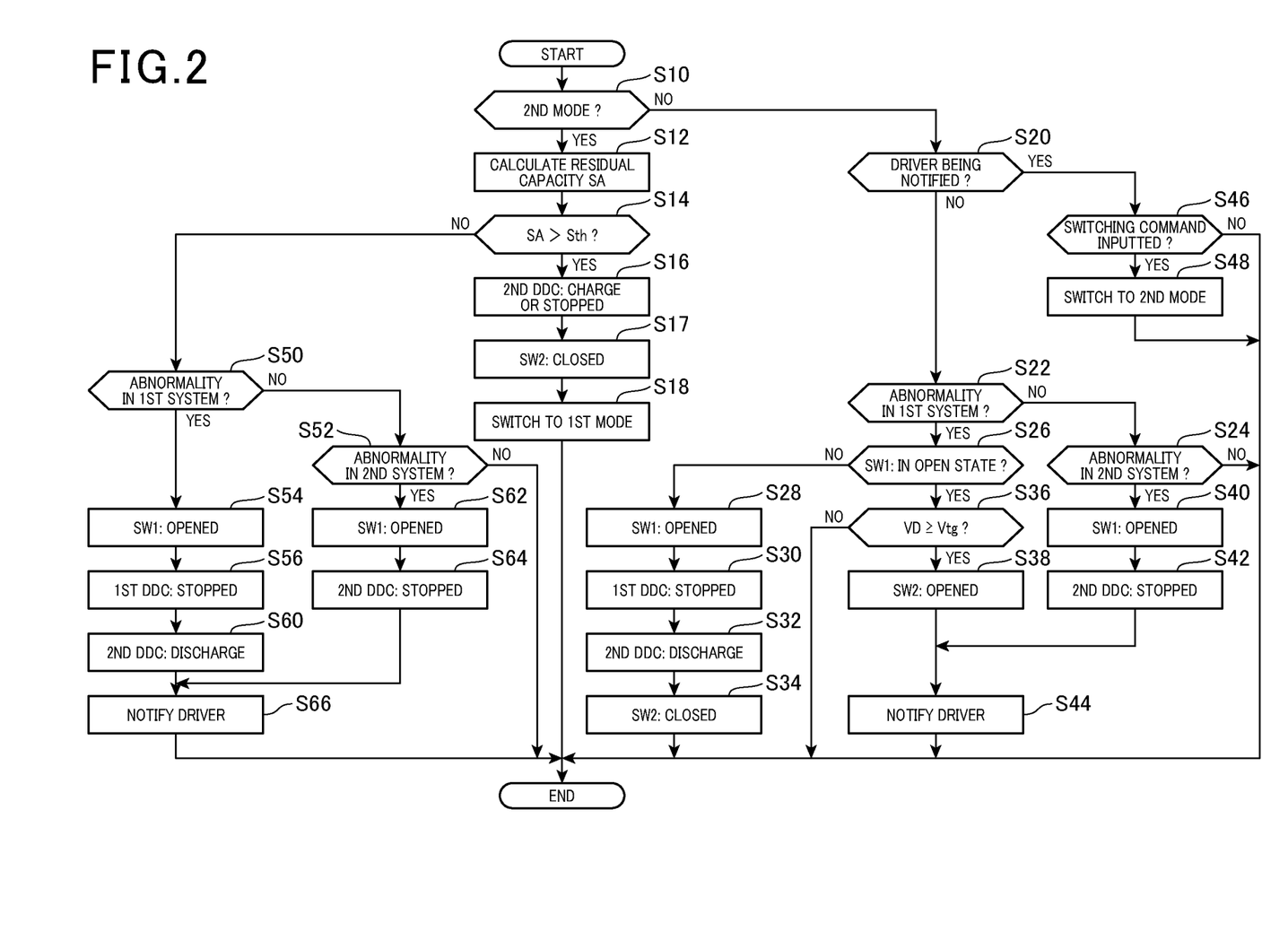
FIG. 2 is a flowchart illustrating the procedure of a control process according to the first embodiment.

FIG. 2 is a flowchart illustrating the control process according to the present embodiment. Upon the IG switch 45 being closed, the control device 40 repeatedly performs the control process at predetermined control cycles. It should be noted that at the initial time when the IG switch 45 is closed, the driving mode of the vehicle is set to the second mode. Moreover, at the initial time, the first switch SW1 is in a closed state; the second switch SW2 is in an open state; the first converter 12 is in the operation state; and the second converter 26 is in the charge operation state.

Upon the control process being started, first, in step S10, it is determined whether the driving mode of the vehicle is the second mode. If the result of the determination in step S10 is affirmative, the control process proceeds to step S12. In step S12, the residual capacity SA of the second storage battery 16 is calculated. The residual capacity SA may be represented by, for example, the SOC (i.e., State Of Charge) of the second storage battery 16. When the second storage battery 16 is in an energized state (i.e., charging state or discharging state), the residual capacity SA is calculated using the current integrated value that is the time-integrated value of the charge/discharge current of the second storage battery 16.

In step S14, it is determined whether the residual capacity SA calculated in step S12 is higher than a predetermined capacity threshold Sth. Here, the capacity threshold Sth is a capacity at which the voltage of the second storage battery 16 becomes higher than the threshold voltage Vth. When the residual capacity SA of the second storage battery 16 is lower than the capacity threshold Sth, the voltage of the second storage battery 16 is not higher than the threshold voltage Vth and thus the prerequisite for driving the vehicle in the first mode is not satisfied. Accordingly, if the result of the determination in step S14 is negative, the control process proceeds to steps S50 and S52.

In contrast, when the residual capacity SA of the second storage battery 16 is higher than the capacity threshold Sth, the voltage of the second storage battery 16 is higher than the power supply voltage VA by a predetermined value or more and thus the prerequisite for driving the vehicle in the first mode is satisfied. Accordingly, if the result of the determination in step S14 is affirmative, the control process proceeds to step S16. In step S16, the second converter 26 is controlled so as to be suitably switched between the charge operation state and the operation-stopped state according to the residual capacity SA of the second storage battery 16. In subsequent step S17, the second switch SW2 is closed. Then, in step S18, the driving mode of the vehicle is permitted to be switched from the second mode to the first mode. Thereafter, the control process is terminated. In addition, the switching of the driving mode to the first mode is performed when a switching command, such as a command to use the driver assistance functions or a command to automatically drive the vehicle, is inputted from the driver via the input unit 46. In the present embodiment, step S18 corresponds to a "mode control unit" in the claims.

On the other hand, if the result of the determination in step S10 is negative, the control process proceeds to step S20. In step S20, it is determined whether a driver notification is being made. Here, the driver notification is a notification of notifying the driver that an abnormality has occurred in either of the first and second systems ES1 and ES2, notifying the driver that the first mode is to be terminated and prompting the driver to switch the driving mode to the second mode.

If the result of the determination in step S20 is negative, the control process proceeds to steps S22 and S24 in which it is determined whether an abnormality has occurred in either of the first and second systems ES1 and ES2. Specifically, in step S22, it is determined whether an abnormality has occurred in the first system ES1. If the result of the determination in step S22 is negative, the control process proceeds to step S24. In step S24, it is determined whether an abnormality has occurred in the second system ES2. In addition, in the present embodiment, step S22 corresponds to an "abnormality determination unit" in the claims.

Occurrence of an abnormality can be determined based on the magnitude and direction of the inter-system current IA detected by the current detection unit 28. For example, when a ground fault has occurred in the first system ES1, the direction of the inter-system current IA detected by the current detection unit 28 is a direction from the second system ES2 to the first system ES1; and the magnitude of the inter-system current IA detected by the current detection unit 28 is higher than or equal to a current threshold Ith preset for ground fault determination. Accordingly, in this case, the magnitude of the electric current flowing to the first system ES1 is higher than or equal to the current threshold Ith. In contrast, when a ground fault has occurred in the second system ES2, the direction of the inter-system current IA detected by the current detection unit 28 is a direction from the the first system ES1 to the second system ES2; and the magnitude of the inter-system current IA detected by the current detection unit 28 is higher than or equal to the current threshold Ith. Accordingly, in this case, the magnitude of the electric current flowing to the second system ES2 is higher than or equal to the current threshold Ith. Therefore, it is possible to determine, based on the magnitude and direction of the inter-system current IA detected by the current detection unit 28, which one of the first and second systems ES1 and ES2 has an abnormality occurring therein.

When no abnormality has occurred in both the first and second systems ES1 and ES2, the result of the determination in step S24 is negative. Then, the control process is terminated.

In contrast, when an abnormality has occurred in one of the first and second systems ES1 and ES2, the supply of electric power to the electrical loads of the one of the two systems which has the abnormality occurring therein is stopped while the supply of electric power to the electrical loads of the other of the two systems which has no abnormality occurring therein is continued.

Specifically, if the result of the determination in step S22 is affirmative, the control process proceeds to step S26. In step S26, it is determined whether the first switch SW1 is in an open state. If the result of the determination in step S26 is negative, the control process proceeds to step S28. In step S28, the first switch SW1 is opened. In subsequent step S30, a command is outputted to switch the first converter 12 from the operation state to the operation-stopped state. Consequently, the supply of electric power to the electrical loads of the first system ES1, where an abnormality has occurred, is stopped. In addition, in the present embodiment, the process in step S28 corresponds to a "state control unit" in the claims.

In step S32, a command is outputted to switch the second converter 26 from the charge operation state to the discharge operation state in which the second converter 26 operates to boost the voltage of the second storage battery 16. After the command is outputted in step S32, the second switch SW2 is closed in subsequent step S34 and then control process is terminated. Consequently, by the discharge of the second storage battery 16 via the second converter 26, the supply of electric power to the second loads 36 is ensured.

On the other hand, if the result of the determination in step S26 is affirmative, i.e., if steps S28 to S34 have already been performed, the control process proceeds to step S36. In step S36, it is determined whether the load voltage VD applied to the second loads 36 is higher than or equal to a predetermined target voltage Vtg. In addition, the load voltage VD is increased, by the discharge of the second storage battery 16 via the second converter 26, to the target voltage Vtg.

When the load voltage VD is lower than the target voltage Vtg, the result of the determination in step S36 is negative. In this case, the control process is terminated while the boosting of the load voltage VD by the second converter 26 is continued. In contrast, when the load voltage VD is higher than or equal to the target voltage Vtg, the result of the determination in step S36 is affirmative. In this case, the second switch SW2 is opened in step S38.

If the result of the determination in step S24 is affirmative, the control process proceeds to step S40. In step S40, the first switch SW1 is opened. Consequently, the supply of electric power from the first converter 12 to the first loads 34 in the first system ES1 is continued. In subsequent step S42, a command is outputted to switch the second converter 26 to the operation-stopped state.

Thereafter, in step S44, the driver is notified, via the notification unit 44, that the first mode is to be terminated. Then, the control process is terminated.

If the result of the determination in step S20 is affirmative, the control process proceeds to step S46. In step S46, it is determined whether a switching command is inputted from the driver via the input unit 46 to switch the driving mode of the vehicle to the second mode. In other words, it is determined whether there is a response of the driver to the driver notification. If the result of the determination in step S46 is negative, the control process is terminated. Consequently, the driving of the vehicle in the first mode is continued using the loads 34 or 36 of the one of the two systems which has no abnormality occurring therein.

On the other hand, if the result of the determination in step S46 is affirmative, the control process proceeds to step S48. In step S48, the driving mode of the vehicle is switched from the first mode to the second mode. Then, the control process is terminated.

If the driving mode of the vehicle is the second mode and the result of the determination in step S14 is negative, the control process proceeds to steps S50 and S52 in which it is determined whether an abnormality has occurred in either of the first and second systems ES1 and ES2. Specifically, in step S50, it is determined whether an abnormality has occurred in the first system ES1. If the result of the determination in step S50 is negative, the control process proceeds to step S52. In step S52, it is determined whether an abnormality has occurred in the second system ES2.

When no abnormality has occurred in both the first and second systems ES1 and ES2, the result of the determination in step S52 is negative. Then, the control process is terminated. Consequently, the driving of the vehicle in the second mode is continued.

In contrast, when an abnormality has occurred in one of the first and second systems ES1 and ES2, the supply of electric power to the electrical loads of the one of the two systems which has the abnormality occurring therein is stopped while the supply of electric power to the electrical loads of the other of the two systems which has no abnormality occurring therein is continued.

Specifically, if the result of the determination in step S50 is affirmative, the control process proceeds to step S54. In step S54, the first switch SW1 is opened. In subsequent step S56, a command is outputted to switch the first converter 12 from the operation state to the operation-stopped state. Then, in step S60, a command is outputted to switch the second converter 26 from the charge operation state to the discharge operation state in which the second converter 26 operates to boost the voltage of the second storage battery 16. Thereafter, the control process proceeds to step S66. That is, in the second mode, the second switch SW2 is not opened/closed during occurrence of an abnormality in first system ES1.

Moreover, if the result of the determination in step S52 is affirmative, the control process proceeds to step S62. In step S62, the first switch SW1 is opened. Consequently, the supply of electric power from the first converter 12 to the first loads 34 in the first system ES1 is continued. In subsequent step S64, a command is outputted to switch the second converter 26 to the operation-stopped state. Then, in step S66, the driver is notified, via the notification unit 44, that an abnormality has occurred in either of the first and second systems ES1 and ES2. Thereafter, the control process is terminated.

Figure 3:
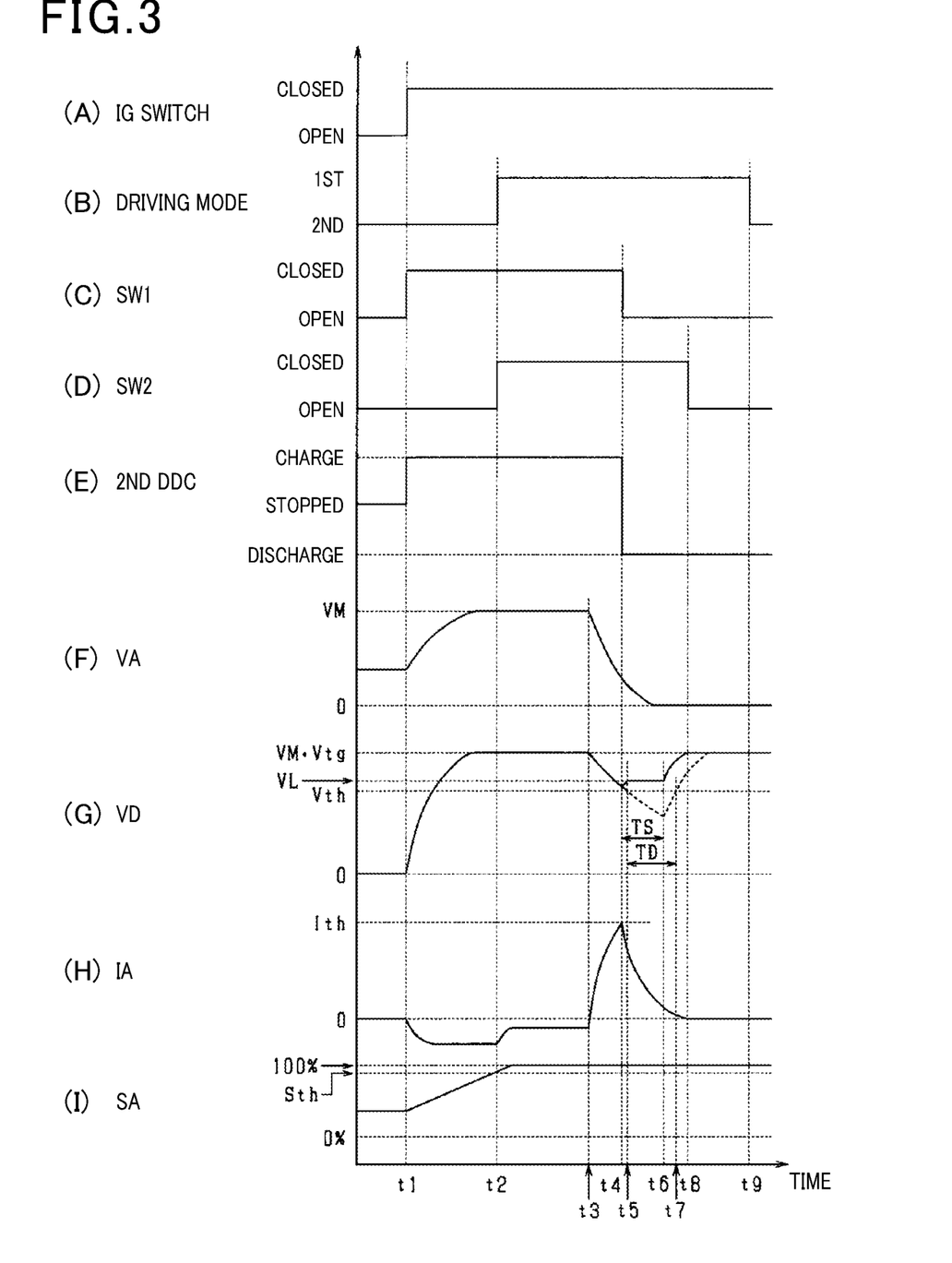
FIG. 3 is a timing chart illustrating an example of the control process according to the first embodiment.

FIG. 3 illustrates an example of the control process according to the present embodiment. Specifically, FIG. 3 illustrates the changes with time of the power supply voltage VA and the load voltage VD when a ground-fault abnormality (hereinafter, to be simply referred to as a ground fault) occurs in the first system ES1 during driving of the vehicle in the first mode.

More specifically, FIG. 3 illustrates: (A) the change with time of the state of the IG switch 45; (B) the change with time of the driving mode of the vehicle; (C) the change with time of the open/closed state of the first switch SW1; (D) the change with time of the open/closed state of the second switch SW2; (E) the change with time of the state of the second converter 26; (F) the change with time of the power supply voltage VA of the first converter 12; (G) the change with time of the load voltage VD of the second loads 36; (H) the change with time of the inter-system current IA; and (I) the change with time of the residual capacity SA of the second storage battery 16. It should be noted that the direction of the inter-system current IA shown in FIG. 3(H) is defined as being positive when it flows from the second system ES2 to the first system ES1.

As shown in FIG. 3, in the period until a time instant t1, the IG switch 45 is in an open state; that is, the power supply system 100 is in a hibernation state. Moreover, in this period, each of the first and second switches SW1 and SW2 is in the open state; and each of the first and second converters 12 and 26 is in the operation-stopped state. Hence, in this period, both the load voltage VD and the inter-system current IA are equal to zero.

Upon the IG switch 45 being closed at the time instant t1, the first switch SW1 is closed; and a command is outputted from the control device 40 to switch the first converter 12 from the operation-stopped state to the operation state and the second converter 26 from the operation-stopped state to the charge operation state. Consequently, the first converter 12 is switched to the operation state; both the power supply voltage VA and the load voltage VD are increased to a predetermined operation voltage VM; and it becomes possible to drive the vehicle in the second mode. Here, the operation voltage VM is a voltage within the range of the drive voltages of the first and second loads 34 and 36; and the operation voltage VM is equal to the target voltage Vtg.

Moreover, the second converter 26 is switched to the charge operation state; and the second storage battery 16 is charged by the power supply voltage VA of the first converter 12. Consequently, the voltage of the second storage battery 16 is increased to a predetermined step-down voltage VL (see FIG. 3(G)) that is higher than the threshold voltage Vth.

When the residual capacity SA of the second storage battery 16 has increased to become higher than the capacity threshold Sth, it becomes possible, at a time instant t2, to switch the driving mode of the vehicle from the second mode to the first mode. Thus, the driving mode of the vehicle is switched to the first mode in accordance with the switching command from the driver; and the second switch SW2 is closed. It should be noted that in the present embodiment, after the driving mode of the vehicle is switched to the first mode, the second converter 26 is kept in the operation state and the charge of the second storage battery 16 is continued. In the first mode, with increase in the residual capacity SA, the charge current of the second storage battery 16 decreases and thus the magnitude of the inter-system current IA decreases. When the residual capacity SA becomes fully charged, the charge of the second storage battery 16 is temporarily stopped.

During the driving of the vehicle in the first mode, it is determined whether a ground fault has occurred in either of the first and second systems ES1 and ES2. When it is determined that no ground fault has occurred in both the first and second systems ES1 and ES2, the first switch SW1 is kept in the closed state. Consequently, it becomes possible to supply electric power from the first converter 12 and the first and second storage batteries 14 and 16 to the first and second loads 34 and 36. Specifically, due to the supply of electric power from the first converter 12, it becomes possible to continuously supply electric power during the autonomous driving of the vehicle for a long time. Moreover, due to the supply of electric power from the first and second storage batteries 14 and 16, it becomes possible to supply electric power with little voltage fluctuation. As a result, during the period from the time instant t2 to a time instant t3, the autonomous driving of the vehicle and the driver assistance are performed using the first loads 34 and the second loads 36.

When it is determined that a ground fault has occurred in either of the first and second systems ES1 and ES2, the first switch SW1 is opened. In the example illustrated in FIG. 3, a ground fault occurs in the first system ES1 at the time instant t3. Consequently, both the power supply voltage VA and the load voltage VD drop from the time instant t3. It should be noted that due to the inductance component of the connection path LB, the load voltage VD drops at a lower rate than the power supply voltage VA.

Moreover, the inter-system current IA increases from the time instant t3. Then, at a time instant t4, the inter-system current IA becomes higher than or equal to the current threshold Ith. Based on the fact that the inter-system current IA has increased to become higher than or equal to the current threshold Ith, it is determined that a ground fault has occurred in the first system ES1. Therefore, at the time instant t4, the first switch SW1 is opened and the first converter 12 is switched to the operation-stopped state. Consequently, the inter-system current IA decreases from the time instant t4.

Furthermore, at the time instant t4, a command is outputted from the control device 40 to switch the second converter 26 to the discharge operation state in which the second converter 26 operates to boost the voltage of the second storage battery 16. Consequently, at a subsequent time instant t6, the discharge of the second storage battery 16 via the second converter 26 is started to increase the load voltage VD. Moreover, during at least part of the predetermined period TS from the time instant t4 to the time instant t6, the second switch SW2 is kept in the closed state. Consequently, during the predetermined period TS, the step-down voltage VL, which is the voltage of the second storage battery 16, is applied to the second loads 36 bypassing the second converter 26.

As shown by a dashed line in FIG. 3(G), if the step-down voltage VL was not applied during the predetermined period TS, the load voltage VD would drop to become lower than the threshold voltage Vth at a time instant t5 between the time instant t4 and the time instant t6. Then, after the start of the discharge of the second storage battery 16, the load voltage VD would increase to become higher than the threshold voltage Vth at a time instant t7. That is, during the voltage drop period TD from the time instant t5 to the time instant t7, the load voltage VD would be lower than threshold voltage Vth and thus the supply of electric power to the second loads 36 would be temporarily interrupted.

In contrast, according to the present embodiment, during the predetermined period TS, the step-down voltage VL is applied to the second loads 36. Since the step-down voltage VL is set to be higher than the threshold voltage Vth, it becomes possible to prevent the load voltage VD from dropping below the threshold voltage Vth when the ground fault has occurred in the first system ES1.

In particular, according to the present embodiment, the second switch SW2 is kept in the closed state in the first mode. Consequently, with decrease in the load voltage VD, the discharge of the second storage battery 16 is performed through the second path LC2, thereby making it possible to supply electric power from the second storage battery 16 to the second loads 36 in an early stage.

When the load voltage VD has increased to the target voltage Vtg at a time instant t8 after the elapse of the predetermined period TS, i.e., after the start of the discharge of the second storage battery 16 via the second converter 26, the second switch SW2 is opened. Consequently, it becomes possible to prevent the second storage battery 16 from being charged by the load voltage VD.

Thereafter, in response to a switching command inputted from the driver via the input unit 46, the driving mode of the vehicle is switched from the first mode to the second mode at a time instant t9.

According to the present embodiment described in detail above, it is possible to achieve the following advantageous effects.

In the present embodiment, the first path LC1 and the second path LC2 are provided in parallel with each other between the connection point PB, at which the connection path LB is connected with the second system ES2, and the second storage battery 16. In the first path LC1, through the electric power conversion by the second converter 26, the second storage battery 16 is charged to a voltage higher than the threshold voltage Vth, which is the lower limit of the drive voltages of the first and second loads 34 and 36 of the specific loads 32, or discharges. On the other hand, through the second path LC2, the voltage of the second storage battery 16 can be applied, bypassing the second converter 26, to the first and second loads 34 and 36.

With the above configuration, when electric power supply from the second storage battery 16 is performed in the second system ES2 due to occurrence of an abnormality in the first system ES1, the second storage battery 16 has been charged to a voltage higher than the threshold voltage Vth that is the lower limit of the drive voltages of the first and second loads 34 and 36. Therefore, during the predetermined period TS required for the electric power conversion by the second converter 26, it is possible to apply the threshold voltage Vth to the second loads 36 bypassing the second converter 26. Consequently, it becomes possible to suitably supply electric power to the loads 34 and 36 in the power supply system 100 that has the plurality of systems including the respective power supplies.

In the present embodiment, in the second path LC2, there is provided the second switch SW2. When an abnormality has occurred in the first system ES1, the second switch SW2 is closed in conjunction with the output of a discharge command to the second converter 26. Specifically, the second switch SW2 is kept in the closed state during the predetermined period TS from when the command to perform discharge of the second storage battery 16 is outputted to the second converter 26 until the discharge operation is started. Consequently, it becomes possible to suitably supply electric power to the second loads 36 when an abnormality has occurred in the first system ES1.

In the present embodiment, the load voltage VD is set to be higher than the voltage of the second storage battery 16 during the discharge of the second storage battery 16 via the second converter 26. With such a configuration, if the second switch SW2 was kept in the closed state after the start of the discharge of the second storage battery 16 via the second converter 26, the increase of the load voltage VD might be delayed due to charge of the second storage battery 16 through the second path LC2 and the load voltage VD might become unstable. In this regard, in the present embodiment, the second switch SW2 is opened after the discharge operation via the second converter 26 is started. Consequently, the load voltage VD can be suitably increased.

In the present embodiment, the first loads 34 and the second loads 36 are loads which perform the driver assistance functions as well as functions necessary for the driving of the vehicle. Moreover, the driving mode of the vehicle is switchable between the first mode using the driver assistance functions and the second mode not using the driver assistance functions. Furthermore, in the present embodiment, the driving mode of the vehicle is permitted to be switched from the second mode to the first mode on condition that the residual capacity SA of the second storage battery 16 is a capacity at which the voltage of the second storage battery 16 is higher than the lower limit of the drive voltages of the first and second loads 34 and 36. Consequently, if an abnormality occurs in the first system ES1 after the switching of the driving mode to the first mode, it will be possible to suitably perform a subsequent fail-safe process.

Second Embodiment

Hereinafter, the second embodiment will be described with reference to FIGS. 4 and 5 focusing on the differences thereof from the first embodiment.

Figure 4:
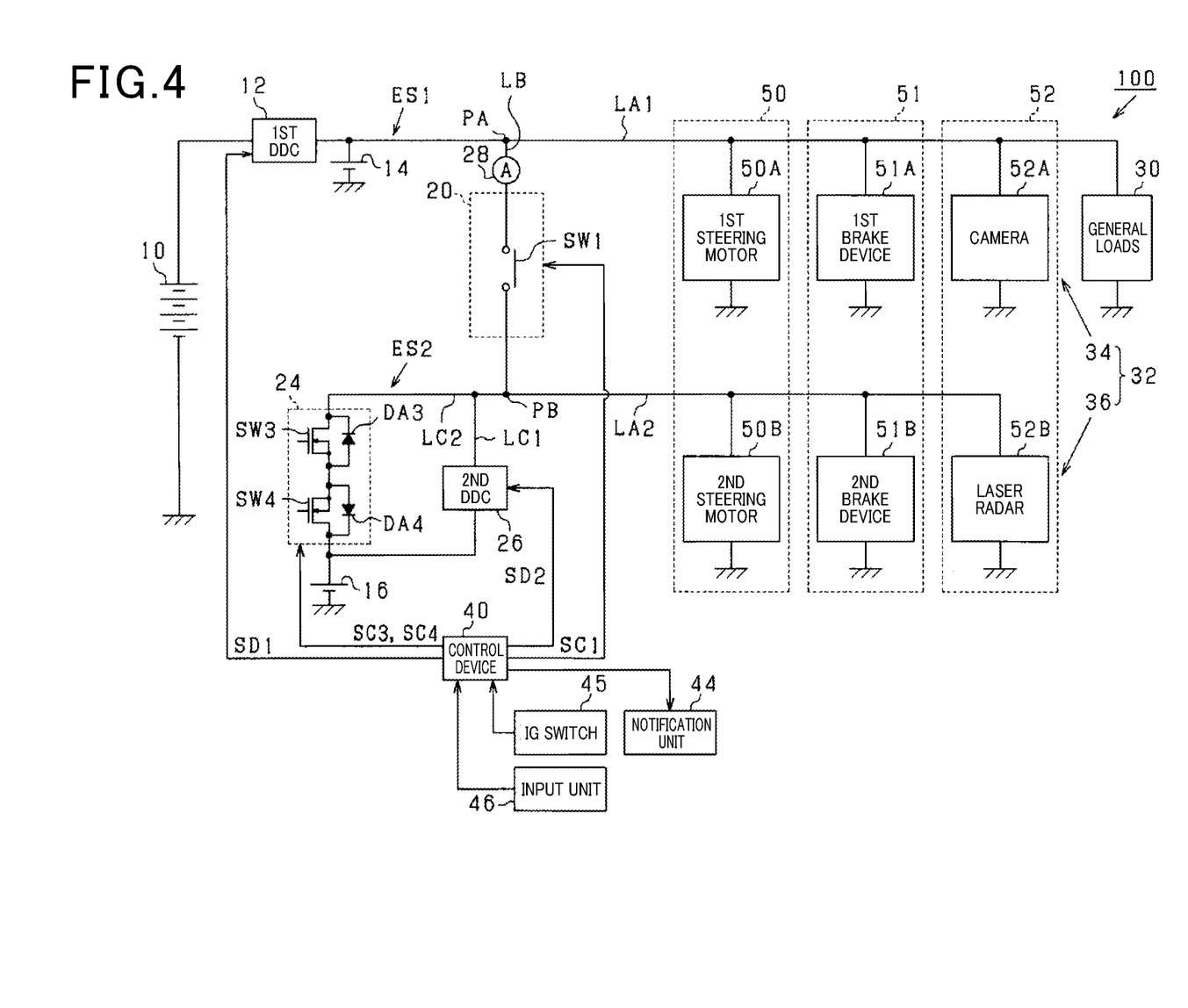
FIG. 4 is an overall configuration diagram of a power supply system according to a second embodiment.

In the present embodiment, as shown in FIG. 4, the second switch unit 24 includes both a third switch SW3 and a fourth switch SW4 that are connected in series with each other, instead of the second switch SW2 described in the first embodiment. In addition, in the second switch unit 24, the third switch SW3 is located closer than the fourth switch SW4 to the connection path LB.

In the present embodiment, MOSFETs, which are semiconductor switching elements, are employed as the third and fourth switches SW3 and SW4. Moreover, a third parasitic diode DA3 is connected in parallel with the third switch SW3; and a fourth parasitic diode DA4 is connected in parallel with the fourth switch SW4. Further, in the present embodiment, the third and fourth switches SW3 and SW4 are connected in series with each other such that the orientations of the third and fourth parasitic diodes DA3 and DA4 of the third and fourth switches SW3 and SW4 are opposite to each other.

Specifically, the third parasitic diode DA3 is arranged with its anode on the second storage battery 16 side and its cathode on the connection path LB side, whereas the fourth parasitic diode DA4 is arranged with its anode on the connection path LB side and its cathode on the second storage battery 16 side. Consequently, the third parasitic diode DA3 restricts electric current from flowing from the connection point PB to the second storage battery 16 in the second path LC2, whereas the fourth parasitic diode DA4 restricts electric current from flowing from the second storage battery 16 to the connection point PB in the second path LC2. In addition, in the present embodiment, the third parasitic diode DA3 corresponds to a "rectifying element" in the claims.

In the present embodiment, in order to perform switching operation of the third switch SW3, the control device 40 generates a third switching signal SC3 and outputs a command by the third switching signal SC3 to the third switch SW3. Moreover, in order to perform switching operation of the fourth switch SW4, the control device 40 generates a fourth switching signal SC4 and outputs a command by the fourth switching signal SC4 to the fourth switch SW4.

Figure 5:
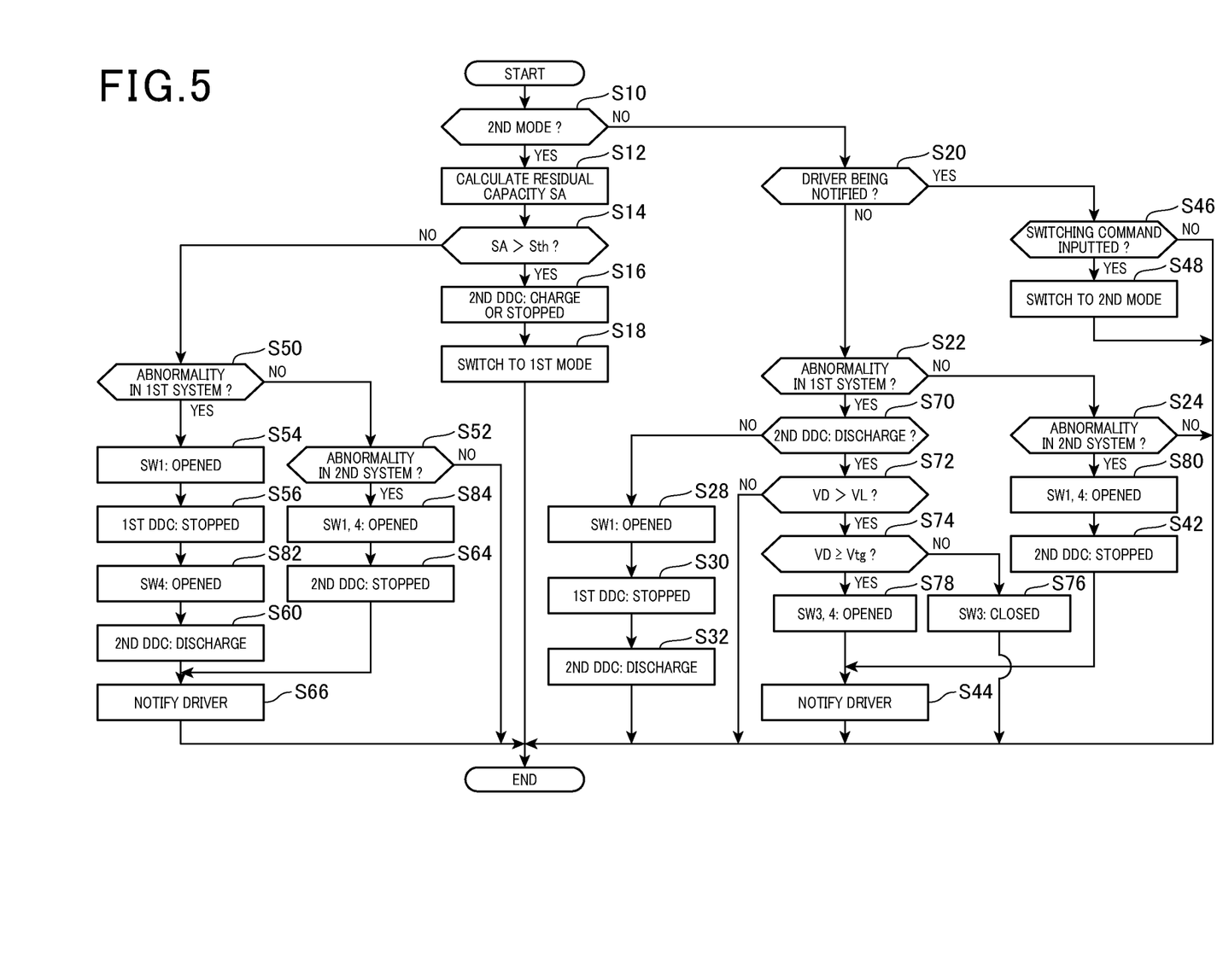
FIG. 5 is a flowchart illustrating the procedure of a control process according to the second embodiment.

FIG. 5 is a flowchart illustrating a control process according to the present embodiment. It should be noted that for the sake of convenience, steps in FIG. 5 identical to those in FIG. 2 are designated by the same step numbers as those in FIG. 2 and explanation thereof will be omitted hereinafter. In addition, in the control process according to the present embodiment, at the initial time when the IG switch 45 is closed, the third switch SW3 is in an open state whereas the fourth switch SW4 is in a closed state.

As shown in FIG. 5, in the control process according to the present embodiment, if the result of the determination in step S22 is affirmative, then it is further determined, in subsequent step S70, whether the second converter 26 is in the discharge operation state. If the result of the determination in step S70 is negative, steps S28 to S32 are performed; then the control process is terminated. On the other hand, if the result of the determination in step S70 is affirmative, i.e., if steps S28 to S32 have already been performed, the control process proceeds to step S72. In step S72, it is determined whether the load voltage VD is higher than the step-down voltage VL of the second storage battery 16.

When the discharge operation of the second converter 26 has not started and thus the load voltage VD is lower than or equal to the step-down voltage VL, the result of the determination in step S72 is negative. In this case, the control process is terminated while the discharge of the second storage battery 16 via the fourth switch SW4 and the third parasitic diode DA3 is continued in the second path LC2. On the other hand, when the discharge operation of the second converter 26 has started and the load voltage VD is higher than the step-down voltage VL, the result of the determination in step S72 is affirmative. In this case, it is further determined, in subsequent step S74, whether the load voltage VD is higher than or equal to the target voltage Vtg.

When the load voltage VD is lower than the target voltage Vtg, the result of the determination in step S74 is negative. In this case, the third switch SW3 is closed (i.e., turned into a conductive state) in step S76; then the control process is terminated. Consequently, the second storage battery 16 discharges via the fourth switch SW4 and the third switch SW3 in the second path LC2. On the other hand, when the load voltage VD is higher than or equal to the target voltage Vtg, the result of the determination in step S74 is affirmative. In this case, both the third and fourth switches SW3 and SW4 are opened in step S78; then the control process to step S44.

Moreover, in the control process according to the present embodiment, if the result of the determination in step S24 is affirmative, the first and fourth switches SW1 and SW4 are opened in step S80. Then, the control process proceeds to step S42.

Furthermore, in the control process according to the present embodiment, if the result of the determination in step S50 is affirmative, steps S54 and S56 are performed. Then, in step S82, the fourth switch SW4 is opened. Thereafter, the control process proceeds to step S60. Moreover, if the result of the determination in step S52 is affirmative, the first and fourth switches SW1 and SW4 are opened in step S84; then, the control process proceeds to step S64.

Figure 6:
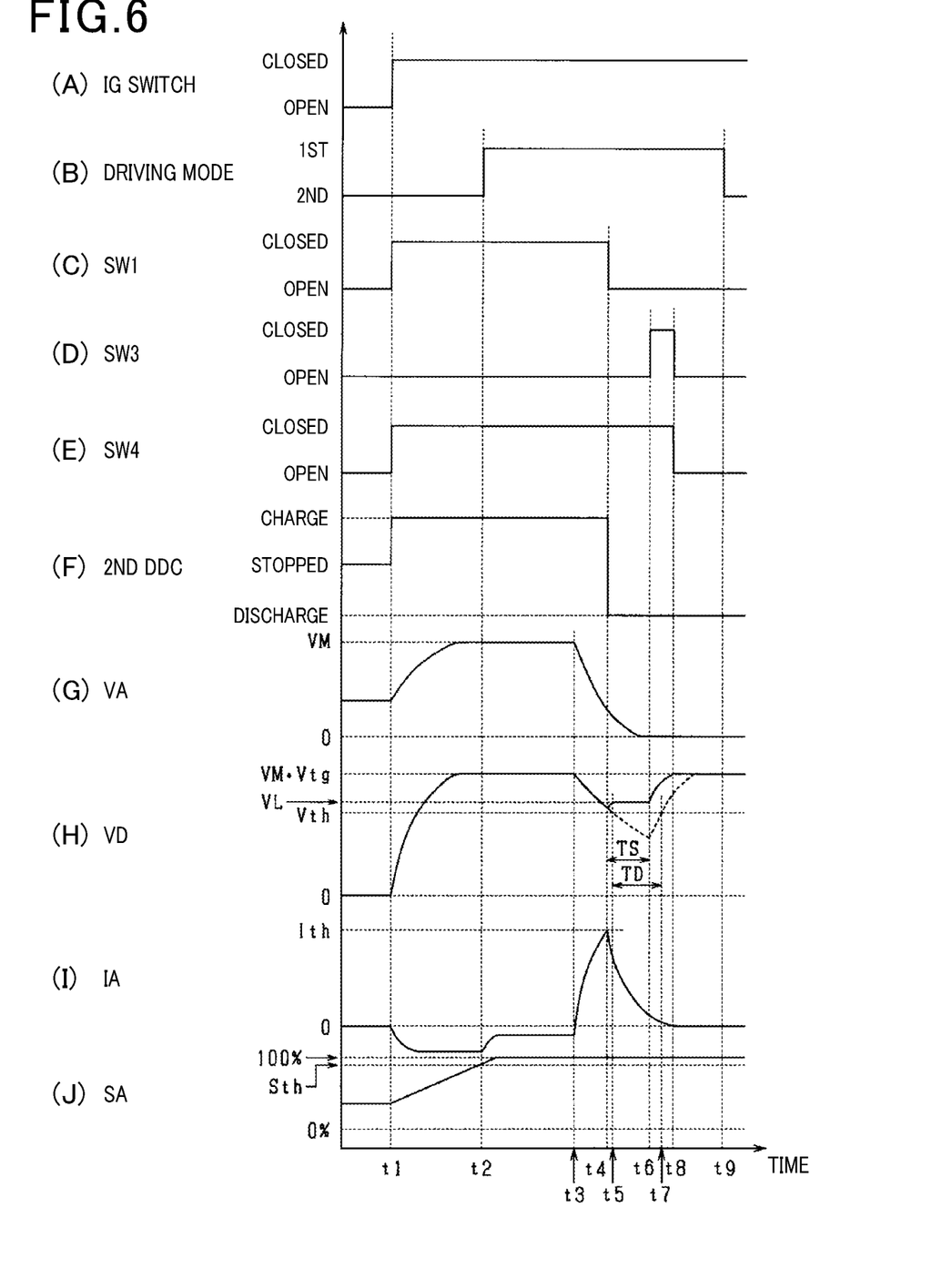
FIG. 6 is a timing chart illustrating an example of the control process according to the second embodiment.

FIG. 6 illustrates the changes with time of the power supply voltage VA and the load voltage VD when a ground fault occurs in the first system ES1 during driving of the vehicle in the first mode. It should be noted that: the parameters (A) to (C) and (F) to (J) shown in FIG. 6 are respectively the same as the parameters (A) to (C) and (E) to (I) shown in FIG. 3; therefore explanation thereof will be omitted hereinafter. Moreover, FIG. 6 illustrates: (D) the change with time of the open/closed state of the third switch SW3; and (E) the change with time of the open/closed state of the fourth switch SW4.

As shown in FIG. 6, the IG switch 45 is in the open state in the period until the time instant t1. Moreover, in this period, each of the third and fourth switches SW3 and SW4 is in the open state. Then, upon the IG switch 45 being closed at the time instant t1, the fourth switch SW4 is closed. Thereafter, the open/closed states of the third and fourth switches SW3 and SW4 are kept unchanged even when the driving mode of the vehicle is switched from the second mode to the first mode at the time instant t2 and when it is determined at the time instant t4 that a ground fault has occurred in the first system ES1. At the time instant t4, since the fourth switch SW4 is in the closed state, the discharge of the second storage battery 16 can be performed via the fourth switch SW4 and the third parasitic diode DA3. Consequently, with decrease in the load voltage VD, the discharge of the second storage battery 16 is performed via the fourth switch SW4 and the third parasitic diode DA3.

When the discharge of the second storage battery 16 via the second converter 26 has started and the load voltage VD has increased to become higher than the step-down voltage VL of the second storage battery 16, the third switch SW3 is closed at the time instant t6. Thereafter, when the load voltage VD has increased to the target voltage Vtg, both the third and fourth switches SW3 and SW4 are opened at the time instant t8.

According to the present embodiment described in detail above, it is possible to achieve the following advantageous effects.

In the present embodiment, in the second path LC2, there is provided the third switch SW3 that includes the third parasitic diode DA3. During the discharge of the second storage battery 16 via the second converter 26, the load voltage VD is increased above the voltage of the second storage battery 16. However, with the third parasitic diode DA3, it becomes possible to restrict electric current from flowing from the connection point PB to the second storage battery 16 in the second path LC2. Consequently, it becomes possible to construct the power supply system 100 using the second storage battery 16 whose rated voltage is lower than the power supply voltage VA. Moreover, when an abnormality has occurred in the first system ES1, the discharge of the second storage battery 16 is performed through the second path LC2 in the second system ES2 with decrease in the load voltage VD, thereby making it possible to supply electric power from the second storage battery 16 to the second loads 36 in an early stage without waiting for the predetermined period TS required for the boosting operation of the second converter 26.

In the present embodiment, the third parasitic diode DA3 of the third switch SW3 is used as a rectifying element. Therefore, there are concerns about the voltage drop in the second path LC2 due to the forward voltage drop of the third parasitic diode DA3 and about heat generation in the third parasitic diode DA3 due to energization thereof. In this regard, in the present embodiment, when an abnormality has occurred in the first system ES1, the third switch SW3 is closed, thereby suppressing the voltage drop in the second path LC2 due to the forward voltage drop of the third parasitic diode DA3 and suppressing heat generation in the third parasitic diode DA3.

In the present embodiment, in the second path LC2, the third and fourth switches SW3 and SW4 are connected in series with each other such that the orientations of the third and fourth parasitic diodes DA3 and DA4 of the third and fourth switches SW3 and SW4 are opposite to each other. Consequently, it becomes possible to prevent over-discharge of the second storage battery 16 when an abnormality has occurred in the second system ES2.

OTHER EMBODIMENTS

The present disclosure is not limited to the above-described embodiments, and may be implemented as follows.

The loads 34 and 36 may include, for example, the following devices.

The loads 34 and 36 may include a traction motor that applies propulsion power to the vehicle and a drive circuit for the traction motor. In this case, the first and second loads 34 and 36 of one of the specific loads 32 may respectively be, for example, a three-phase permanent magnet synchronous motor and a three-phase inverter device.

The loads 34 and 36 may include an anti-lock brake system that prevents the vehicle wheels from locking up during braking. In this case, each of the first and second loads 34 and 36 of one of the specific loads 32 may be, for example, an ABS actuator that can independently regulate the brake hydraulic pressure during braking.

The loads 34 and 36 may include a cruise control system that is configured to: detect a preceding vehicle traveling ahead of the own vehicle; keep, when a preceding vehicle has been detected, the inter-vehicle distance between the own vehicle and the preceding vehicle constant; and drive, when no preceding vehicle has been detected, the own vehicle to travel at a preset speed. In this case, each of the first and second loads 34 and 36 of one of the specific loads 32 may be, for example, a millimeter-wave radar.

Each pair of the loads 34 and 36 is not necessarily constituted of a combination of two devices having the same configuration. Instead, each pair of the loads 34 and 36 may be constituted of a combination of two devices that perform equivalent functions with different configurations. Moreover, the first and second loads 34 and 36 of any of the specific loads 32 may be constituted of a single load that is supplied with electric power through both the first-system internal path LA1 and the second-system internal path LA2.

The voltage generator of the first power supply is not limited to the first converter 12, but may alternatively be implemented by, for example, an alternator. Furthermore, the first power supply may include only the first storage battery 14 without any voltage generator.

In the above-described embodiments, the predetermined period TS is set to the period from the time instant t4 to the time instant t6, i.e., to the period from when the command to perform discharge of the second storage battery 16 is outputted to the second converter 26 until the discharge of the second storage battery 16 is actually started. The period from the time instant t4 to the time instant t6 may be set in advance based on the internal resistance of the second storage battery 16, the wiring resistance of the first path LC1 and the like. However, the period from the time instant t4 to the time instant t6 may vary depending on, for example, the ambient temperature of the power supply system 100. Therefore, in consideration of this variation, the predetermined period TS may alternatively be set to a period that includes the period from the time instant t4 to the time instant t6, in other words, to a period longer than the period from the time instant t4 to the time instant t6.

In the above-described second embodiment, the rectifying element provided in the second path LC2 is implemented by the third parasitic diode DA3 of the third switch SW3. However, the rectifying element may alternatively be provided in other forms.

Figure 7:
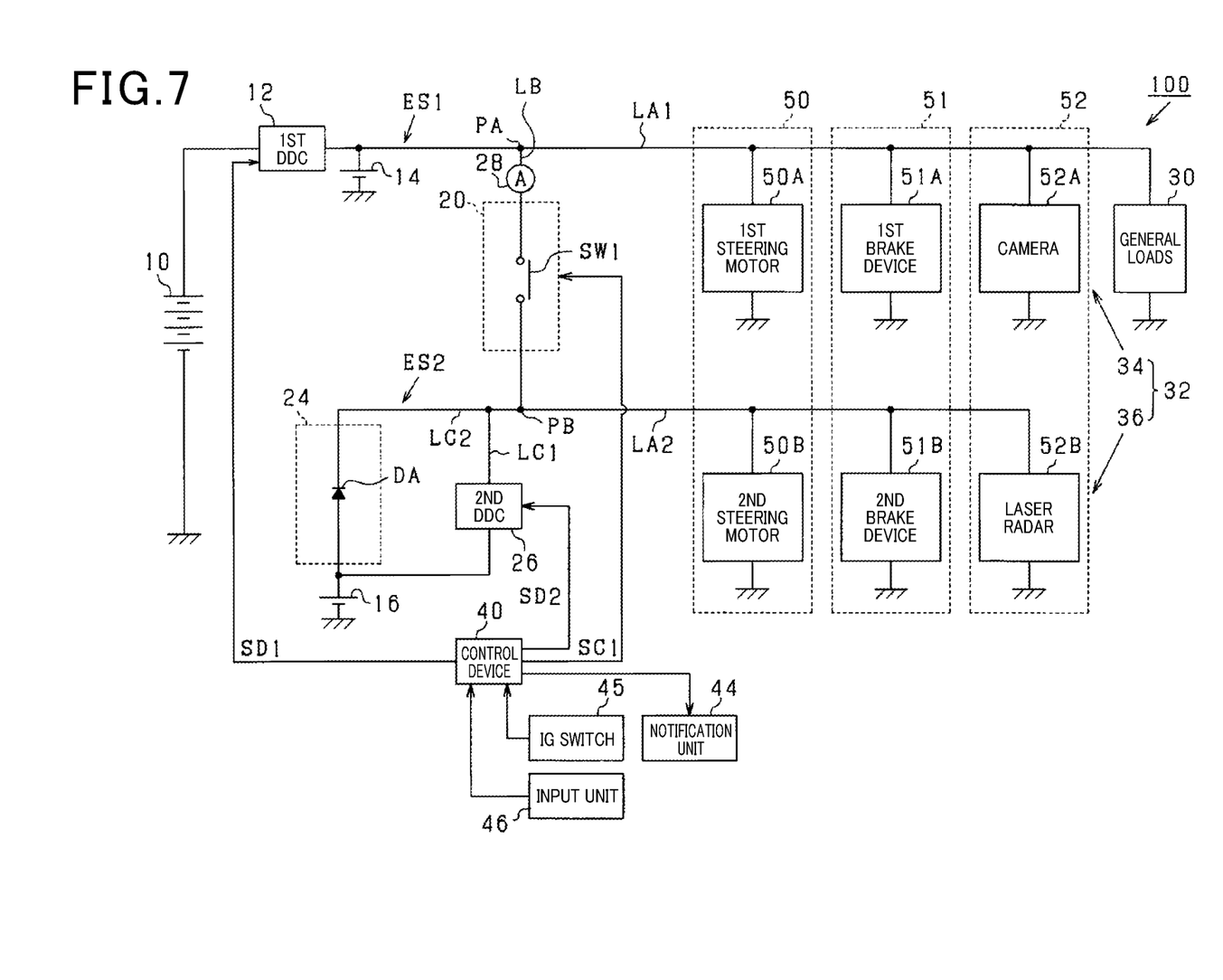
FIG. 7 is an overall configuration diagram of a power supply system according to another embodiment.

For example, as shown in FIG. 7, the rectifying element may alternatively be implemented by a single diode element. Specifically, in the example shown in FIG. 7, the second switch unit 24 includes only a diode DA that is a single diode element. In addition, the diode DA in this example is identical to the diode DA described in the first embodiment; therefore, explanation thereof will be omitted hereinafter.

Furthermore, the rectifying element provided in the second path LC2 is not limited to a diode. For example, the rectifying element may alternatively be implemented by a thyristor.

In the above-described embodiments, the power supply system 100 is applied to the vehicle capable of traveling by either manual driving or autonomous driving. However, the power supply system 100 can also be applied to a vehicle capable of traveling only by autonomous driving, such as a fully autonomous vehicle, and to a vehicle capable of traveling only by manual driving.

For example, in the case of the power supply system 100 being applied to a vehicle capable of traveling only by autonomous driving, when an abnormality has occurred in one of the first and second systems ES1 and ES2, it is possible to perform, using the loads 34 or 36 of the other of the first and second systems ES1 and ES2 which has no abnormality occurring therein, a process of immediately stopping the traveling of the vehicle or a process of first driving the vehicle to a safe place and then stopping the traveling of the vehicle.

While the present disclosure has been described pursuant to the embodiments, it should be appreciated that the present disclosure is not limited to the embodiments and the structures. Instead, the present disclosure encompasses various modifications and changes within equivalent ranges. In addition, various combinations and modes are also included in the category and the scope of technical idea of the present disclosure.

What is claimed is:

1. A power supply system comprising:
electrical loads;
a first system including a first power supply connected with the electrical loads;
a second system including a second power supply connected with the electrical loads; and
an inter-system switch provided in a connection path that connects the first and second systems with each other, wherein:
the first power supply outputs a power supply voltage to drive the electrical loads; and
the second power supply includes a storage battery chargeable by the power supply voltage of the first power supply,
the power supply system further comprising:
an abnormality determination unit that determines whether an abnormality has occurred in the first system; and
a state control unit that opens the inter-system switch when the abnormality determination unit determines that an abnormality has occurred in the first system, wherein:
a first path and a second path are provided in parallel with each other between a connection point, at which the connection path is connected with the second system, and the second power supply;
in the first path, there is provided an electric power converter that performs electric power conversion when the storage battery is charged with electric power supplied from the first power supply and when the storage battery discharges;
the storage battery is configured to be charged, by the electric power converter, to a voltage higher than a lower limit of drive voltages of the electrical loads; and
through the second path, the voltage of the storage battery is applied, bypassing the electric power converter, to the electrical loads.

2. The power supply system as set forth in claim 1, wherein:
in the second path, there is provided a battery switch that opens or closes the second path;
the electric power converter performs or stops charge/discharge of the storage battery according to a command from the state control unit;
when the abnormality determination unit determines that an abnormality has occurred in the first system, the state control unit opens the inter-system switch and outputs, to the electric power converter, the command to perform discharge of the storage battery; and
the state control unit keeps the battery switch in a closed state during a predetermined period including a period from when the command is outputted until the discharge of the storage battery is started.

3. The power supply system as set forth in claim 2, wherein:
the electric power converter performs, during the discharge of the storage battery, a boosting operation to boost the voltage of the storage battery; and
the state control unit opens the battery switch after the discharge of the storage battery is started.

4. The power supply system as set forth in claim 1, wherein:
the electric power converter performs, during charge of the storage battery, a step-down operation to step down the voltage of the storage battery;
the electric power converter also performs, during discharge of the storage battery, a boosting operation to boost the voltage of the storage battery; and
in the second path, there is provided a rectifying element that restricts electric current from flowing from the connection point to the storage battery in the second path.

5. The power supply system as set forth in claim 4, wherein:
in the second path, there is provided a semiconductor switching element that includes a parasitic diode;
the parasitic diode constitutes the rectifying element; and
the state control unit turns the semiconductor switching element into a conductive state when the abnormality determination unit determines that an abnormality has occurred in the first system.

6. The power supply system as set forth in claim 1, wherein:
the power supply system is installed in a vehicle;
each of the electrical loads performs a driver assistance function of the vehicle as well as at least one function necessary for driving of the vehicle;
a driving mode of the vehicle is switchable between a first mode using the driver assistance function and a second mode not using the driver assistance function; and
the power supply system further comprises a mode control unit that permits the driving mode of the vehicle to be switched from the second mode to the first mode on condition that a state of charge of the storage battery is such that the voltage of the storage battery is higher than the lower limit of the drive voltages of the electrical loads.

* * * * *